F. A. RICH.
APPARATUS FOR DRYING COPRA AND TREATING OTHER SUBSTANCES.
APPLICATION FILED MAR. 18, 1916.
1,298,790.
Patented Apr. 1, 1919.
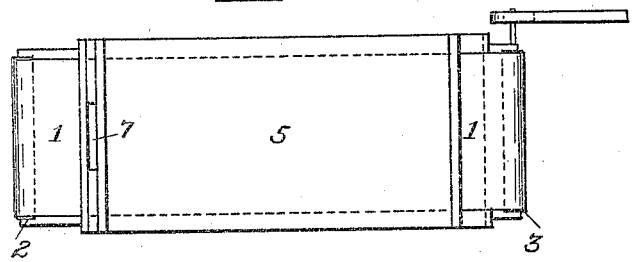
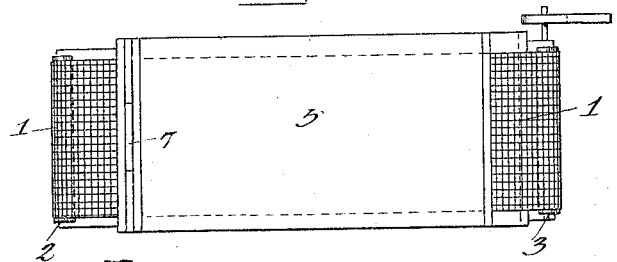
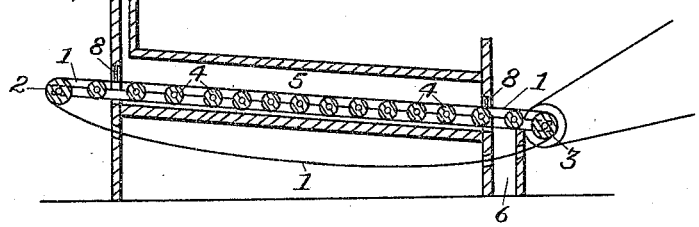
Francis Arthur Rich,
Inventor,
by Lawrence Languid
Attorney

UNITED STATES PATENT OFFICE.

FRANCIS ARTHUR RICH, OF SYDNEY, NEW SOUTH WALES, AUSTRALIA, ASSIGNOR OF ONE-HALF TO DENIS WATKIN KIRK, OF WHAKATANE, NEW ZEALAND.

APPARATUS FOR DRYING COPRA AND TREATING OTHER SUBSTANCES.

1,298,790.  Specification of Letters Patent.  Patented Apr. 1, 1919.

Application filed March 18, 1916. Serial No. 85,209.

*To all whom it may concern:*

Be it known that I, FRANCIS ARTHUR RICH, a subject of His Majesty the King of the United Kingdom of Great Britain and Ireland, resident of Sydney, in the State of New South Wales and Commonwealth of Australia, have invented an Apparatus for Drying Copra and Treating other Substances, of which the following is a specification.

The object of this invention is to provide an improved apparatus for the treatment of cocoanuts in making copra, said apparatus being also suitable for the baking, roasting and drying of other substances.

According to this invention the cocoanuts after being opened are subjected to artificial heat which causes the inner or fleshy part to dry off the nut, and to be dried off to the requirements of good copra in the one operation. The apparatus in which the drying operations take place and in the case of other substances where baking, roasting and drying operations are also performed, consists of an oven or conduit heated internally by either continuous or intermittent passages of heated air, steam or gas, the nuts or other substances being either passed through the oven or conduit on an endless conveyer traveling at the required speed, or placed upon a suitable movable or stationary platform or shelf within the oven or conduit.

The invention will be further described with reference to the accompanying drawing in which:—

Figure 1 is a plan view of the internally heated oven and Fig. 2 a sectional elevation thereof showing a plain or solid endless conveyer.

Fig. 3 is a plan view of the internal heated oven showing an open mesh conveyer.

In the drawing 1 is a continuous conveyer or carrier running around rollers 2 and 3 to the latter of which mechanical or other power is applied to move the conveyer 1.

The upper side of the conveyer 1 is passed through the oven or heating or drying chamber 5 and is supported by rollers 4 bearing in the sides of the oven which is provided with a hot air steam or gas entrance 6, and a discharge outlet 7.

Flexible aprons or baffle fringes 8 are provided over the openings in the oven where the conveyer enters and leaves same to prevent as far as possible the escape of hot air, gas or steam from the oven.

The cocoanuts to be dried or other substances to be heated, steamed, dried, baked or roasted are placed on the upper side of the traveling conveyer which is geared to move at a speed which will permit of the nuts or other substances emerging from the oven in the desired state.

The conveyer 1 is pliable and is preferably formed with openings therein or meshed to permit the hot air, gas or steam to pass freely therethrough but may be used without openings if required.

The entrance of hot air, gas or steam into the oven may be continuous or intermittent as desired.

The treatment of cocoanuts by artificial heat for the purpose of shelling and drying the cocoanut substance greatly facilitates and cheapens the cost of the preparation of the nuts for the production of copra, while the internal heating of the oven by hot air, steam or gas enables the drying of the nuts and treatment of other substances to be carried out more efficiently and expeditiously than when an ordinary oven is used, the heating medium being directed on to the articles in the oven, instead of on to the oven itself which absorbs a large proportion of the heat, a part of which absorbed heat is all that is sometimes available as is frequently the case in bakers' ovens.

Having now fully described my invention, what I desire to claim and secure by Letters Patent is:—

1. An inclined endless conveyer, a hot air oven inclosing the upper side only of the conveyer, supporting rollers beneath the upper side of the conveyer within and without said oven, walls for said oven having an inlet and an outlet for the hot air and having openings through which said conveyer passes into and out of said oven, and flexible flaps in said openings.

2. An open meshed endless conveyer, a hot air oven inclosing the upper side only of the conveyer, supporting rollers beneath the upper side of the conveyer within and without said oven, walls for said oven having an inlet and an outlet for the hot air and having openings through which said conveyer passes into and out of said oven, and flexible flaps in said openings.

In testimony whereof I have hereunto set my hand in presence of two subscribing witnesses.

FRANCIS ARTHUR RICH.

Witnesses:
CHARLES E. GRAHAM,
HENRY W. CLARKE.